(12) United States Patent
Kadosh et al.

(10) Patent No.: US 11,973,669 B1
(45) Date of Patent: Apr. 30, 2024

(54) STATISTICAL PACKET AND BYTE COUNTERS

(71) Applicant: Cisco Technology, Inc., San Jose, CA (US)

(72) Inventors: Aviran Kadosh, Moreshet (IL); Shira Turgeman, Tel Aviv (IL)

(73) Assignee: CISCO TECHNOLOGY, INC., San Jose, CA (US)

( * ) Notice: Subject to any disclaimer, the term of this patent is extended or adjusted under 35 U.S.C. 154(b) by 559 days.

(21) Appl. No.: 17/159,906

(22) Filed: Jan. 27, 2021

Related U.S. Application Data

(63) Continuation of application No. 16/895,104, filed on Jun. 8, 2020, now abandoned.

(60) Provisional application No. 62/945,996, filed on Dec. 10, 2019.

(51) Int. Cl.
*H04L 43/02* (2022.01)
*G06N 7/01* (2023.01)
*H04L 69/22* (2022.01)

(52) U.S. Cl.
CPC .............. *H04L 43/02* (2013.01); *G06N 7/01* (2023.01); *H04L 69/22* (2013.01)

(58) Field of Classification Search
CPC ............ H04L 43/02; H04L 69/22; G06N 7/01
See application file for complete search history.

(56) References Cited

U.S. PATENT DOCUMENTS

| | | | |
|---|---|---|---|
| 6,665,725 B1 | 12/2003 | Dietz et al. | |
| 7,466,703 B1 | 12/2008 | Arunachalam et al. | |
| 7,688,734 B2 * | 3/2010 | Hellenthal | H04L 47/50 370/231 |
| 8,767,549 B2 | 7/2014 | Kashyap et al. | |
| 9,781,018 B2 * | 10/2017 | Arad | H04L 43/0876 |
| 10,333,802 B2 * | 6/2019 | Arad | H04L 47/215 |
| 11,159,455 B1 * | 10/2021 | Matthews | H04L 47/22 |
| 11,232,016 B1 * | 1/2022 | Huynh | G06N 3/045 |
| 2004/0213370 A1 | 10/2004 | Smallwood et al. | |
| 2007/0038743 A1 * | 2/2007 | Hellhake | H04L 61/5014 709/224 |
| 2007/0121504 A1 * | 5/2007 | Hellenthal | H04L 47/39 370/235 |
| 2008/0037420 A1 * | 2/2008 | Tang | H04L 69/163 370/231 |
| 2014/0328196 A1 * | 11/2014 | Arad | H04L 41/147 370/252 |
| 2016/0142280 A1 * | 5/2016 | Krishnamoorthy | G06F 11/263 703/20 |
| 2019/0044657 A1 * | 2/2019 | Biederman | H04L 1/0045 |

(Continued)

*Primary Examiner* — Jay P Patel

(74) *Attorney, Agent, or Firm* — Edell, Shapiro & Finnan, LLC

(57) ABSTRACT

Presented herein are methodologies in which packets or events are selected statistically to update a counter of a network device. The updated value that is stored in the counter also reflects a number of packets (or corresponding bytes) that were not selected to update the counter. The methodology includes receiving, at a network device, a first packet followed by a second packet, probabilistically selecting the second packet to update a value of a counter of the network device while probabilistically not selecting the first packet to update the value of the counter, and updating the value of the counter to account for both the first packet and the second packet.

20 Claims, 8 Drawing Sheets

(56) References Cited

U.S. PATENT DOCUMENTS

2021/0003662 A1\* 1/2021 Aydogdu .............. G01S 13/343
2021/0048786 A1\* 2/2021 Mast ....................... G06F 9/542

\* cited by examiner

| TIME | INCOMING PACKET SIZE | Lmax | PROB TO SEND UPDATE | SEND UPDATE | UPDATE SIZE |
|---|---|---|---|---|---|
| $t_1$ | 250 | 1000 | 0.25 | NO | --- |
| $t_2$ | 1200 | 1000 | 1 | YES | 1200 |
| $t_3$ | 250 | 1000 | 0.25 | NO | --- |
| $t_4$ | 2000 | 1000 | 1 | YES | 2000 |
| $t_5$ | 25 | 1000 | 0.25 | YES | 1000 |
| $t_6$ | 250 | 1000 | 0.25 | NO | --- |

FIG.3

| ENTRY | VALUE |
|---|---|
| 0 | -- |
| 1 | 32 |
| 2 | 16 |
| 3 | 10.66 |
| 4 | 8 |
| 5 | 6.4 |
| 6 | 5.33 |
| 7 | 4.57 |

FIG.5

STATISTICAL PACKET AND BYTE COUNTERS

CROSS REFERENCE TO RELATED APPLICATION

This application is a continuation of U.S. patent application Ser. No. 16/895,104, filed Jun. 8, 2020, which claims the benefit of Provisional Patent Application No. 62/945,996, filed Dec. 10, 2019, the entire contents of which are incorporated herein by reference.

TECHNICAL FIELD

The present disclosure relates to counters for network switching and routing devices.

BACKGROUND

Counting packets and bytes, among other things, is essential in any switching or routing platform. It is sometimes the only way a system administrator can get a view into what is happening in a network. To this end, many counters are implemented in hardware (HW), and a typical networking device might include hundreds or, even, thousands of counters. Due to the large number of counters, they are typically maintained in, e.g., static random access memory (SRAM) memory blocks, for better area and power efficiency.

However, keeping these counters in such memories implies a limitation on the access rate to the counters. Specifically, the access rate to any such counter is limited to the access rate the memory block can accommodate which is typically one access every clock cycle or, perhaps, every two clock cycles. Low bandwidth switches can work around this limitation by strategically grouping counters in different memory blocks according to their functionality. In this way, when one packet has to update multiple counters, the system accesses different memory blocks.

High bandwidth devices, on the other hand, such as those with, e.g., multicore processors, can process more than one packet per clock cycle. To keep up with that level of bandwidth, counters may be replicated proportionally to the number of packets processed in a clock cycle. For example, assuming the maximal access rate to the counters is once every clock cycle and the network device processes four packets per clock cycle, and all packets are expected to cause an adjustment (e.g., increment, etc.) to the same counter, the counter may be replicated four times, whereby each packet is assigned to one counter. Unfortunately, this replication solution is not optimal from area, power and design complexity standpoints. Additionally, such an approach increases the software complexity that is needed to periodically access multiple counters and sum them together, instead of accessing only one counter, to obtain an accurate single count value.

BRIEF DESCRIPTION OF THE DRAWINGS

FIG. 3 is a table showing examples of packets of various sizes that are received over time at network device in accordance with an example embodiment

FIG. 5 shows an example table that is used to determine a value for a number of packets that have been processed by a network device that operates a statistical counter in accordance with an example embodiment.

DESCRIPTION OF EXAMPLE EMBODIMENTS

Overview

Presented herein are methodologies in which packets or events are selected statistically to update a counter of a network device. The updated value that is stored in the counter also reflects the number of packets that were not selected to update the counter. The methodology includes receiving, at a network device, a first packet followed by a second packet, probabilistically selecting the second packet to update a value of a counter of the network device and probabilistically not selecting the first packet to update the value of the counter, and updating the value of the counter to account for both the first packet and the second packet.

A device or apparatus is also described. The device may include a network interface unit configured to enable communications via a network; a memory configured to store logic instructions; and a processor, when executing the logic instructions, configured to: receive a first packet followed by a second packet, probabilistically select the second packet to update a value of a counter of the network device and probabilistically not select the first packet to update the value of the counter, and update the value of the counter to account for both the first packet and the second packet.

EXAMPLE EMBODIMENTS

Figure 1:
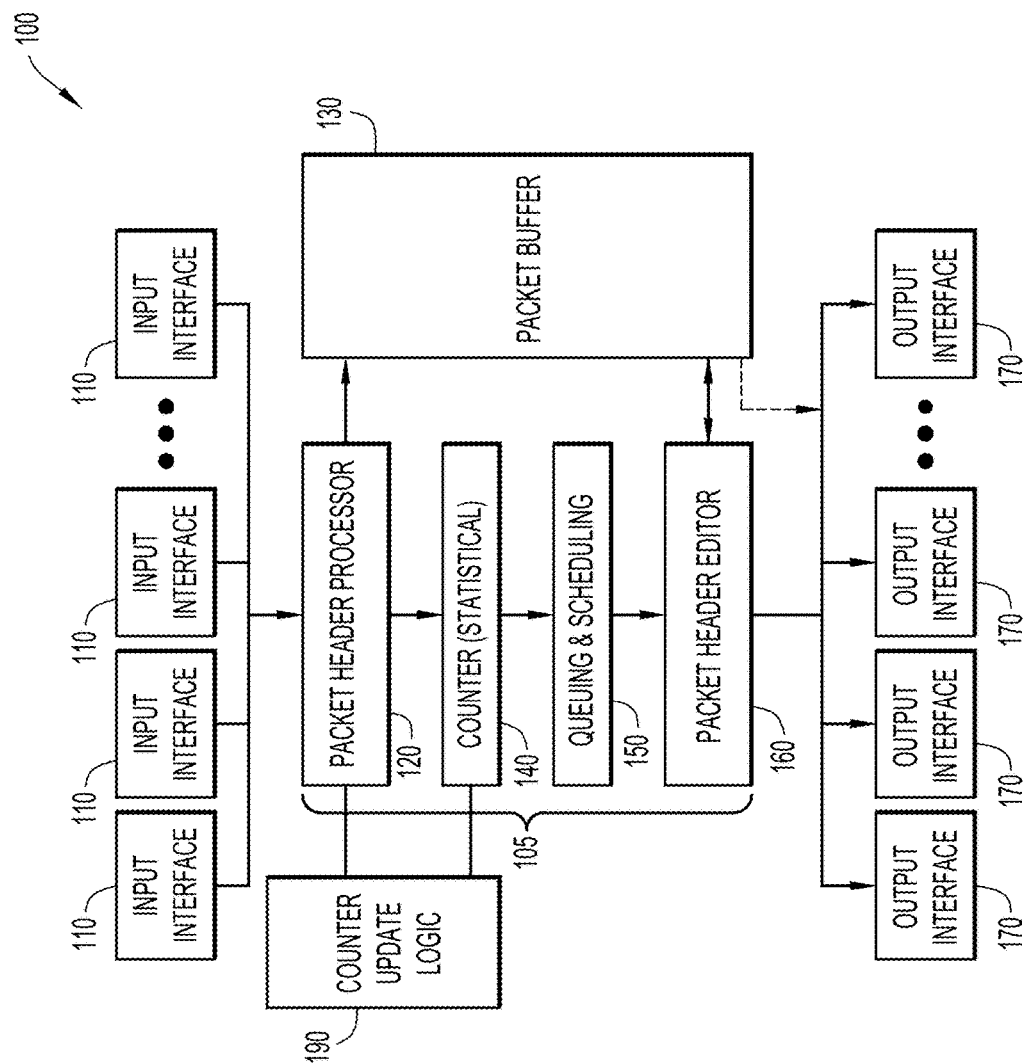
FIG. 1 is a block diagram showing a statistical counter shared by one processing slice/pipe with higher bandwidth than the counter's memory access rate in accordance with an example embodiment.

FIG. 1 is a block diagram showing a statistical counter shared by one processing slice/pipe with higher bandwidth than the counter's memory access rate in accordance with an example embodiment. As shown, a switch, router or other like network device 100 includes a plurality of input interfaces 110 (e.g., line cards) that are in communication with a packet header processor 120. The packet header processor is in communication with a packet buffer 130. The packet header processor 120 is also in communication with a counter 140, which, as will be explained in detail below, is configured as a "statistical" counter under the control of counter update logic 190. Counter 140 may be configured to count bytes or packets, for example. Those skilled in the art will appreciate that, as noted before, network device 100 may include hundreds, if not thousands, of counters. However, for ease of explanation, only one counter is shown in FIG. 1.

Counter 140 is in communication with queuing and scheduling module 150, which, in turn, is in communication with packet header editor 160. Packet header editor 160 edits respective packet headers of packets that are stored in packet buffer 130, and then passes those packets to selected output interfaces 170 (e.g., line cards). For example, packet header editor might add a next hop address for the packet. As shown, packets may alternatively be supplied to output interfaces 170 directly from packet buffer 130. The precise architecture is not critical for purposes of describing the present embodiments that are related to counter 140. Packet header processor 120, counter 140, queuing and scheduling module 150 and packet header editor 160 may be considered to be part of one processing slice/pipe 105.

At a high level, and in accordance with an embodiment, as packets are received at network device 100 via the several input interfaces 110, counter 140 is adjusted to keep track of a given metric associated with those packets. For example, counter 140 might keep track of a number of packets from a given Internet Protocol (IP) source address, or a number of bytes received by network device 100 via a given input interface 110.

Given the limited access to, e.g., SRAM, counter 140 may not be able to keep up with the number of incoming packets, however. In accordance with the embodiments described herein, and to cope with the challenge of limited memory access, and thus limited counter access, counter 140 is not (indeed cannot necessarily be) updated upon receipt of every packet or event. To address the limited access issue, packets or events are selected statistically, or probabilistically, to update counter 140. However, the value with which counter 140 is updated also reflects, approximately, the number of packets (or bytes) that were not selected to update counter 140. That is, the counter value is set to compensate for packets (or bytes) that did not directly update counter 140.

The access probability (to counter 140) is defined according to a ratio between the counter access rate and the event or packet rate. For example, if the counter access rate is 1 access per clock cycle and the packet rate is 4 packets per clock cycle, the sampling probability of a packet, i.e., the probability that a given packet updates counter 140, is 0.25. Since maximal packet rate is derived from the packet size—the larger the packets, the lower the packet rate—the packet size is used for determining the probability of access. The actual updated value depends on the type of counting—e.g., whether it is the number of bytes, or the number of packets (or events).

More specifically, every incoming packet has a probability to trigger an update to counter 140. The probability is linear to the packet size, i.e., the larger the packet, the higher are the odds that that packet will trigger an update. In accordance with an embodiment, the packet that triggers a counter update increases/adjusts counter 140 with/to a value that also compensates for the packets that did not trigger an update.

Denoting the packet size with L, and the probability to perform an update of counter 140 with P, the updated value, when counting bytes—$L_{update}$—is the following:

$$L_{Update} = L + L\left(\frac{1-P}{P}\right) = \frac{L}{P}$$

The following expression is used for the update probability:

$$P = \min\left(\frac{L}{L_{Max}}, 1\right)$$

Embedding the probability to the $L_{Update}$ expression yields a constant update value:

$$L_{Update} = \max(L_{Max}, L)$$

Thus, the manner in which the sampling probability is selected leads to two counter update values: the packet size in bytes if the packet size is larger than $L_{max}$, or $L_{max}$ otherwise.

The size $L_{Max}$ is chosen to be the packet size that yields the maximum or lower access rate allowed by the memory.

Figure 2:
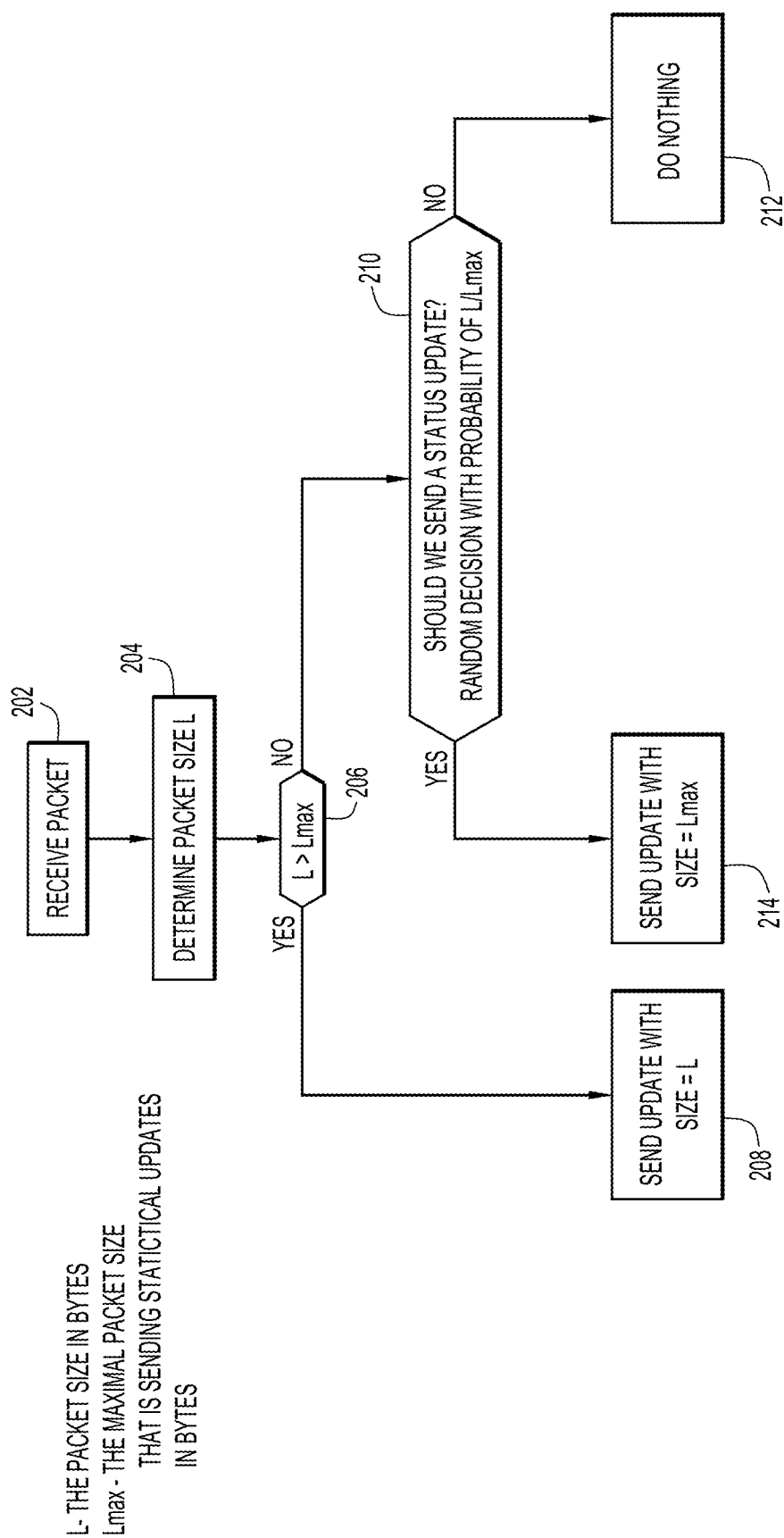
FIG. 2 is a flowchart depicting a series of operations configured to select an appropriate counter update value for a number of bytes in accordance with an example embodiment.

FIG. 2 is a flowchart depicting a series of operations configured to select an appropriate counter update value for a number of bytes in accordance with an example embodiment. At 202, a packet is received at, e.g., network device 100. At 204, network device 100 determines a size of the packet L. The packet size may be obtained, for example, from the packet header by packet header processor 120. That is, packet size is a standard field in a packet header that packet header processor 120 can easily extract and supply to counter update logic 190. In the context of Layer 2 operations, an IP entire packet may first be stored in order to obtain its size.

At 206, counter update logic 190 determines whether packet size L is greater than $L_{Max}$. If the packet size is greater than $L_{Max}$ then, counter 140 is updated with the value L.

If, at 206, L is not greater than $L_{Max}$, then at 210 it is determined, probabilistically, whether the counter 140 should be updated. If the counter 140 is not to be updated, then at 212, nothing further is done with respect to the counter 140 at this time. On the other hand, if at 210, it is determined, probabilistically, that counter 140 should be updated, then at 214, counter 140 is updated with $L_{Max}$.

FIG. 3 is a table showing examples of packets of various sizes that are received over time at network device 100 in accordance with an example embodiment. As can be seen from the table, those packets having a size greater than $L_{Max}$ (in this case 1000 bytes), will cause counter 140 to be updated with the actual packet size of those packets. See, for example, times $t_2$, and $t_4$. (with 1200, and 2000 byte update sizes, respectively) On the other hand, probabilistically, only one out of the four remaining packets will directly cause the counter to be updated. That is, the packets received at times $t_1$, $t_3$, and $t_6$ do not cause counter 140 to be updated, while the packet received at time $t_5$ does cause counter 140 to be updated, with update value $L_{Max}$.

When meters on network device 100 are set to rate limit according to packet rate and when counting the number of packets that have passed through a packet-rate meter, the number of packets to update should be $L_{max}/L$.

To facilitate the implementation and the divider function, and in accordance with an embodiment, a configurable lookup table is employed that maps the packet size to a value based on the $L_{Max}$ value.

Figure 4:
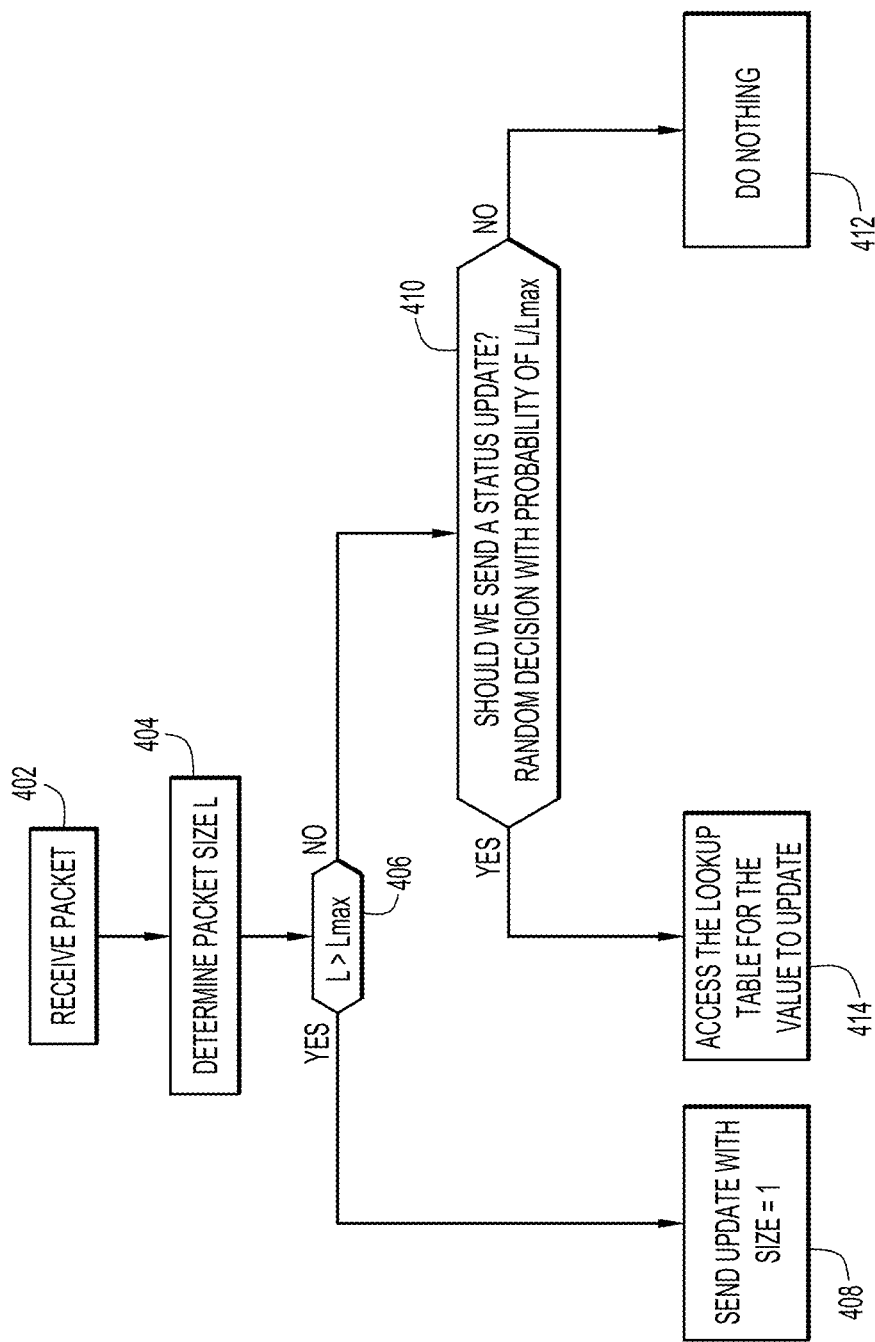
FIG. 4 is a flowchart depicting a series of operations configured to select an appropriate counter update value for a number of packets in accordance with an example embodiment.

FIG. 4 is a flowchart depicting a series of operations configured to select an appropriate counter update value for a number of packets in accordance with an example embodiment. At 402, a packet is received at, e.g., network device 100. At 404, network device 100 determines a size of the packet L. The packet size may be obtained, for example, from the packet header by packet header processor 120. That is, packet size is a standard field in a packet header that packet header processor can easily extract and supply to counter update logic 190.

At 406, the counter update logic 190 determines whether packet size L is greater than $L_{Max}$. If the packet size is greater than $L_{Max}$, then counter 140 is updated with the value of 1, i.e., one packet.

Figure 5:
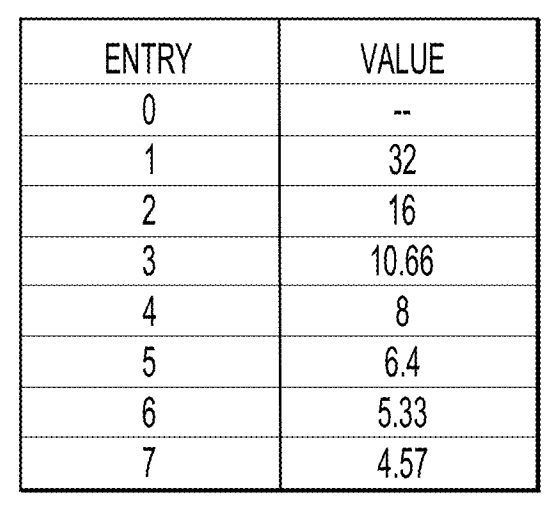

If, at 406, L is not greater than $L_{Max}$, then at 410 it is determined, probabilistically, whether the counter 140 should be updated. If the counter 140 is not to be updated, then at 412, nothing further is done with respect to the counter 140 at this time. On the other hand, if at 410, it is determined, probabilistically, that counter 140 should be updated, then at 414, counter 140 is updated with a value based on a lookup table. FIG. 5 shows an example lookup table that may be used to determine a value for a number of packets that have been processed by network device 100 that operates a statistical counter in accordance with an example embodiment.

Data in such a lookup table is configured as follows, with i being the table index and 32 being bytes resolution (and wherein the exception is entry 0 which is irrelevant) such a lookup table will have Max Packet Size/32 entries:

$$TableData(i) = \frac{L_{Max}}{32 \times i}$$

The table is accessed with the following address:

$$TableAddr(i) = RoundDown\left(\frac{L + rand(0 .. 31)}{32}\right)$$

For purposes of an example, assume packet size L=70

The exact value that should be used to update counter 140 is $L_{max}/L=14.62$. However, such a division function can be cumbersome. Instead, in accordance with an embodiment, the lookup table of FIG. 4 is used.

Since the table address is selected using a random number between 0 and 31, assume 32 packets performed the update, wherein each of these 32 packets received a different random number (0-31).

With reference to the lookup table of FIG. 4, assume entry 2 is accessed for 26 of the packets (the packets that each received a random number 0-25) since the calculation is Address=RoundDown((70+[0 . . . 25])/32)=2.

Assume further that entry 3 is accessed for 6 of the packets (the packets that each received a random number 26-31) since the calculation is Address=RoundDown((70+ [26 . . . 31])/32)=3.

The overall packet number value that counter 140 will have is:

26×16+6×10.66=479.96.

If the exact calculation were used (i.e., using actual division) counter 140 would be updated as follows: 14.62× 32=467.84.

By using the lookup table approach there is only approximately a 2% deviation from the actual exact division calculation. Notably, such accuracy is acceptable for most real world implementations.

In accordance with another example implementation, a lookup table of 128 entries that are each 15 bits wide is provided.

Of the 15 bits, the 7 MSb is an integer between 0 to 127.

Of the 15 bits, the 8 LSb is a fraction of an integer with resolution (i.e., basic unit) of $2^{-8}$. An alternative way to understand this aspect of the word is that it as an integer number of units of $2^{-8}$.

In accordance with a methodology, counter update logic 190 maps the packet size L to an entry in the lookup table.

Entry index=INT((L+rand(0 . . . 31))/32).

The first entry is accessed by packets larger than L and the second entry is not used.

Counter update logic 190 configures each entry with the value roundup $(L/(EntryIndex*32)*2^8)$.

First entry (EntryIndex=0) is set to 1.0, i.e., $2^8$ units of $2^{-8}$.

The value that is used to update the packet-counter is the value of the entry that the packet size is mapped to.

Figure 6:
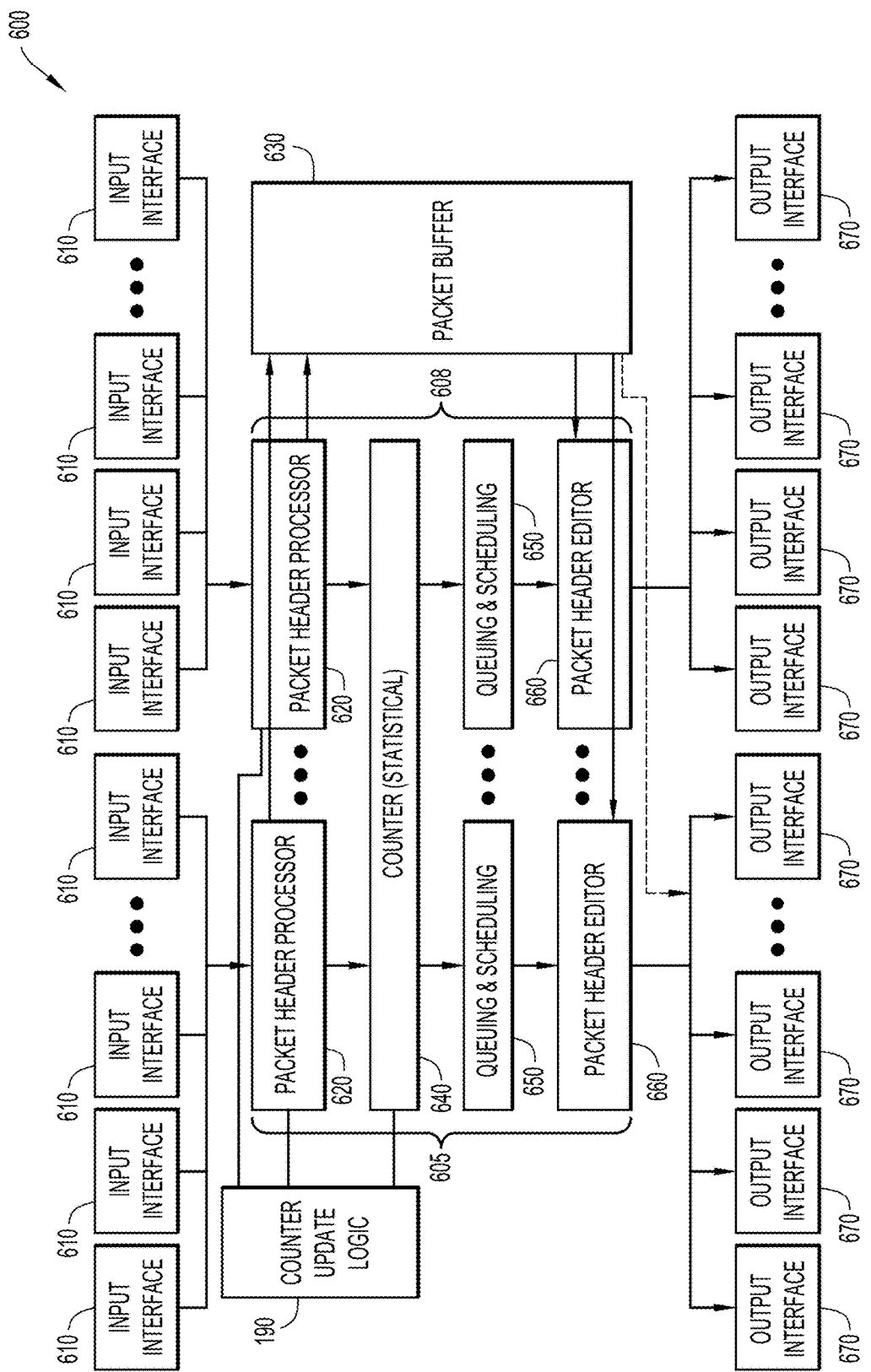
FIG. 6 is a block diagram showing a statistical counters shared by multiple processing slices/pipes with higher bandwidth than the counter's memory access rate in accordance with an example embodiment.

FIG. 6 is a block diagram showing a statistical counter shared by multiple processing slices/pipes with higher bandwidth than the counter's memory access rate in accordance with an example embodiment. As shown, a switch, router or other like network device 600 includes a plurality of input interfaces 610 (e.g., line cards) that are in communication with a packet header processors 620. The packet header processors 620 are in communication with a packet buffer 630. The packet header processor 620 is also in communication with a counter 640, which, as explained above with respect to counter 140, is configured as a "statistical" counter under the control of counter update logic 190. Counter 640 may be configured to count bytes or packets. Those skilled in the art will appreciate that, as noted before, network device 100 may include hundreds, if not thousands, of counters. In the embodiment depicted in FIG. 6, only one counter 640 is shown.

Counter 640 is in communication with queuing and scheduling modules 650, which, in turn, are in communication with packet header editors 660. Packet header editors 660 edit respective packet headers of packets that are stored in packet buffer 630, and then pass those packets to selected output interfaces 670 (e.g., line cards). For example, packet header editors 660 might add a next hop address for a given packet. As shown, packets may alternatively be supplied to output interfaces 670 directly from packet buffer 630. Respective packet header processors 620, counter 640, queuing and scheduling modules 650 and packet header editors 660 may be considered to be grouped in a first processing slice/pipe 605 and a second processing slice/pipe 608. The description of the functionality of counter 140 in connection with FIGS. 2-5 is applicable to counter 640 in the embodiment of FIG. 6 as well.

Figure 7:
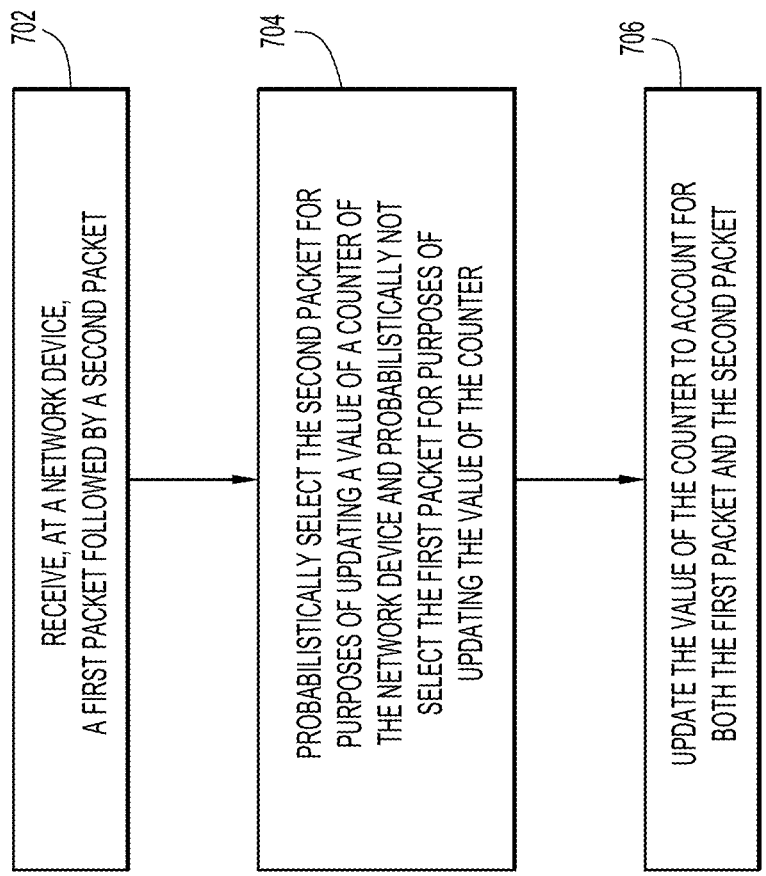
FIG. 7 is a flowchart depicting a plurality of steps for performing statistical counting in a network device according to an example embodiment.

FIG. 7 is a flowchart depicting a plurality of steps for performing statistical counting in a network device according to an example embodiment. At 702, an operation receives, at a network device, a first packet followed by a second packet. At 704, an operation probabilistically selects the second packet for purposes of updating a value of a counter of the network device and probabilistically not select the first packet for purposes of updating the value of the counter. At 706, an operation updates the value of the counter to account for both the first packet and the second packet.

Figure 8:
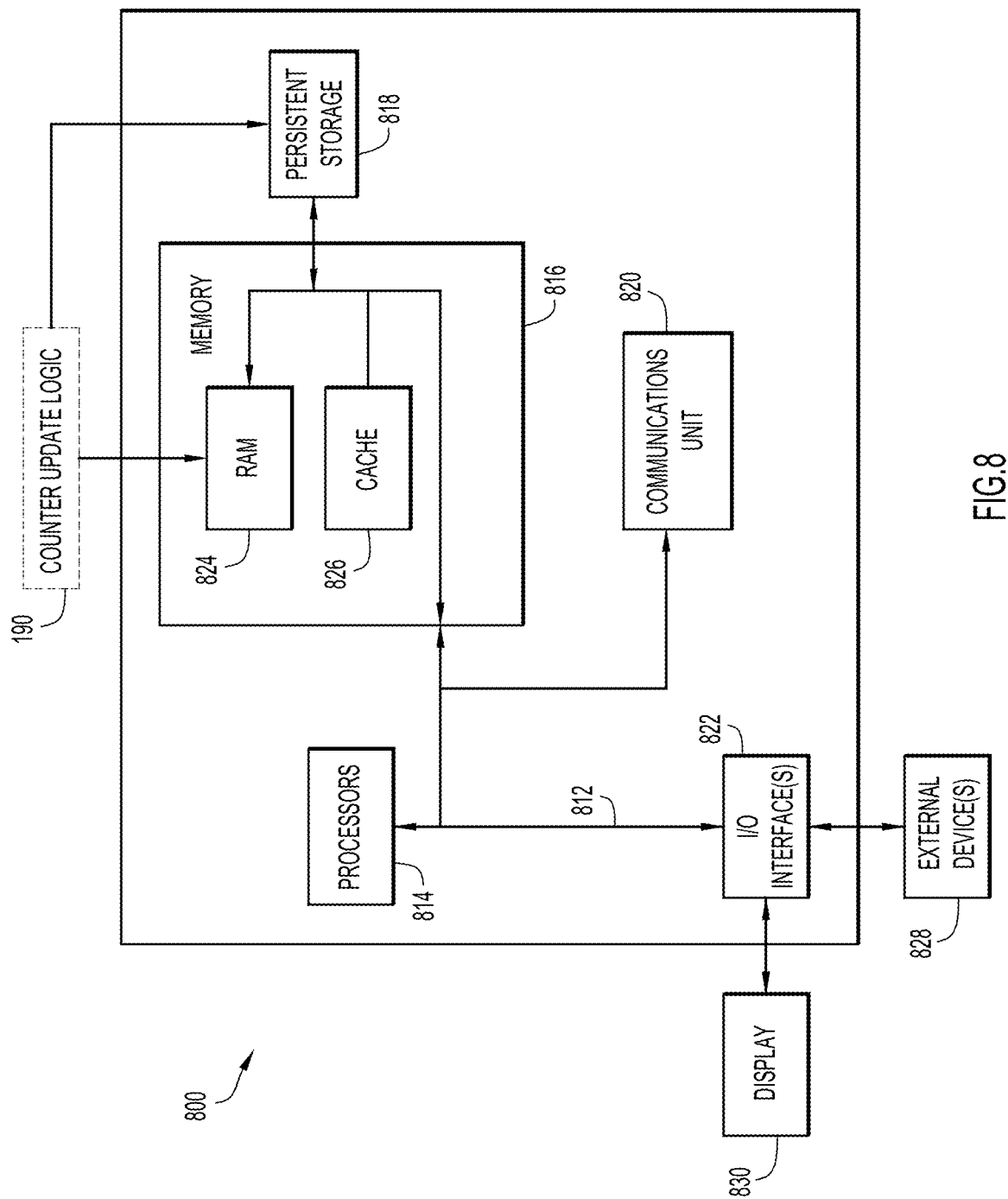
FIG. 8 depicts a device (e.g., a network device) that executes counter update logic in accordance with an example embodiment.

FIG. 8 depicts a device (e.g., a network device 100, 600) that executes counter update logic 190 in accordance with an example embodiment. It should be appreciated that FIG. 8 provides only an illustration of one embodiment and does not imply any limitations with regard to the environments in which different embodiments may be implemented. Many modifications to the depicted environment may be made.

Indeed, in many implementations of a device configured to host counter update logic 190, much of the hardware described below may not be needed.

As depicted, the device 800 includes a bus 812, which provides communications between computer processor(s) 814, memory 816, persistent storage 818, communications unit 820, and input/output (I/O) interface(s) 822. Bus 812 can be implemented with any architecture designed for passing data and/or control information between processors (such as microprocessors, communications and network processors, etc.), system memory, peripheral devices, and any other hardware components within a system. For example, bus 812 can be implemented with one or more buses.

Memory 816 and persistent storage 818 are computer readable storage media. In the depicted embodiment, memory 816 includes random access memory (RAM) 824 and cache memory 826. In general, memory 816 can include any suitable volatile or non-volatile computer readable storage media. Instructions for the counter update logic 190 may be stored in memory 816 or persistent storage 818 for execution by processor(s) 814.

One or more programs may be stored in persistent storage 818 for execution by one or more of the respective computer processors 814 via one or more memories of memory 816. The persistent storage 818 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 818 may also be removable. For example, a removable hard drive may be used for persistent storage 818. Other examples include optical and magnetic disks, thumb drives, and smart cards that are inserted into a drive for transfer onto another computer readable storage medium that is also part of persistent storage 818.

Communications unit 820, in these examples, provides for communications with other data processing systems or devices. In these examples, communications unit 820 includes one or more network interface cards. Communications unit 820 may provide communications through the use of either or both physical and wireless communications links.

I/O interface(s) 822 allows for input and output of data with other devices that may be connected to device 800. For example, I/O interface 822 may provide a connection to external devices 828 such as a keyboard, keypad, a touch screen, and/or some other suitable input device. External devices 828 can also include portable computer readable storage media such as database systems, thumb drives, portable optical or magnetic disks, and memory cards.

Software and data used to practice embodiments can be stored on such portable computer readable storage media and can be loaded onto persistent storage 818 via I/O interface(s) 822. I/O interface(s) 822 may also connect to a display 830. Display 830 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), digital logic gates in one or more fixed or programmable integrated circuits, or programmable logic arrays (PLA) may execute the instructions by utilizing configuring the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, in one form, a method is provided. The method includes receiving, at a network device, a first packet followed by a second packet; probabilistically selecting the second packet for purposes of updating a value of a counter of the network device and probabilistically not selecting the first packet for purposes of updating the value of the counter; and updating the value of the counter to account for both the first packet and the second packet.

In the method, the counter may be configured to count one of bytes or packets.

In the method, a rate of receiving the first packet and the second packet is faster than an access rate to the counter.

The method may further include receiving a third packet, determining a size of the third packet, and when the size of the third packet is greater than a predetermined threshold, updating the counter with a value corresponding to the size of the third packet. The predetermined threshold may be set to a minimum packet size that yields a maximum counter access rate.

The method may also include determining a size of the third packet by inspecting a header of the third packet.

The method may also include receiving a third packet, determining a size of the third packet, and when the size of the third packet is less than a predetermined threshold, updating the counter with a value corresponding to the predetermined threshold.

In an embodiment, the value of the counter corresponds to a number of packets, and the method may further include receiving a third packet, determining a size of the third packet, and when the size of the third packet is greater than a predetermined threshold, updating the counter with a value of one.

In an embodiment, the value of the counter corresponds to a number of packets, and the method may include receiving a third packet, determining a size of the third packet, and when the size of the third packet is less than a predetermined threshold, accessing a lookup table to obtain a value with which to update the counter.

In an embodiment, the lookup table may be accessed via an addressing mechanism that relies on a random number input.

In another form, an apparatus device may also be provided in accordance with an embodiment. The device may include a network interface unit configured to enable communications via a network; a memory configured to store logic instructions; and a processor, when executing the logic instructions, configured to: receive a first packet followed by a second packet; probabilistically select the second packet for purposes of updating a value of a counter of the apparatus and probabilistically not select the first packet for purposes of updating the value of the counter; and update the value of the counter to account for both the first packet and the second packet.

In an embodiment, the counter may be configured to count one of bytes or packets.

In an embodiment, a rate of at which the first packet and the second packet is received is faster than an access rate to the counter.

The processor may be further configured to receive a third packet, determine a size of the third packet, and when the size of the third packet is greater than a predetermined threshold, update the counter with a value corresponding to the size of the third packet.

In an embodiment, the predetermined threshold may be set to a minimum packet size that yields a maximum counter access rate.

In an embodiment, the processor is further configured to receive a third packet, determine a size of the third packet, and when the size of the third packet is less than a predetermined threshold, update the counter with a value corresponding to the predetermined threshold.

In an embodiment, the value of the counter corresponds to a number of packets, and the processor may be further configured to receive a third packet, determine a size of the third packet, and when the size of the third packet is greater than a predetermined threshold, update the counter with a value of one.

In an embodiment, the value of the counter corresponds to a number of packets, and the processor may be further configured to receive a third packet, determine a size of the third packet, and when the size of the third packet is less than a predetermined threshold, access a lookup table to obtain a value with which to update the counter.

In still another form, a non-transitory computer readable storage media is provided that is encoded with instructions that, when executed by a processor, cause the processor to receive, at a network device, a first packet followed by a second packet; probabilistically select the second packet for purposes of updating a value of a counter of the network device and probabilistically not select the first packet for purposes of updating the value of the counter; and update the value of the counter to account for both the first packet and the second packet.

In an embodiment, a rate of receiving the first packet and the second packet is faster than an access rate to the counter.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving, at a network device, a first packet followed by a second packet;
probabilistically selecting the second packet to update a value of a counter of the network device and probabilistically not selecting the first packet to update the value of the counter; and
updating the value of the counter to account for both the first packet and the second packet,
wherein a probability of selecting the second packet to update the value of the counter is based on a size of the second packet.

2. The method of claim 1, wherein the counter is configured to count one of bytes or packets.

3. The method of claim 1, wherein a rate of receiving the first packet and the second packet is faster than an access rate to the counter.

4. The method of claim 1, further comprising receiving a third packet, determining a size of the third packet, and when the size of the third packet is greater than a predetermined threshold, updating the counter with a value corresponding to the size of the third packet.

5. The method of claim 4, wherein the predetermined threshold is set to a minimum packet size that yields a maximum counter access rate.

6. The method of claim 4, further comprising determining a size of the third packet by inspecting a header of the third packet.

7. The method of claim 1, further comprising receiving a third packet, determining a size of the third packet, and when the size of the third packet is less than a predetermined threshold, updating the counter with a value corresponding to the predetermined threshold.

8. The method of claim 1, wherein the value of the counter corresponds to a number of packets, and the method further comprising receiving a third packet, determining a size of the third packet, and when the size of the third packet is greater than a predetermined threshold, updating the counter with a value of one.

9. The method of claim 1, wherein the value of the counter corresponds to a number of packets, and the method further comprising receiving a third packet, determining a size of the third packet, and when the size of the third packet is less than a predetermined threshold, accessing a lookup table to obtain a value with which to update the counter.

10. The method of claim 9, wherein the lookup table is accessed via an addressing mechanism that relies on a random number input.

11. An apparatus comprising:
a network interface unit configured to enable communications via a network;
a memory configured to store logic instructions; and
a processor, when executing the logic instructions, configured to:
receive a first packet followed by a second packet;
probabilistically select the second packet to update a value of a counter of the apparatus and probabilistically not select the first packet to update the value of the counter; and
update the value of the counter to account for both the first packet and the second packet,
wherein a probability to select the second packet to update the value of the counter is based on a size of the second packet.

12. The apparatus of claim 11, wherein the counter is configured to count one of bytes or packets.

13. The apparatus of claim 11, wherein a rate of at which the first packet and the second packet is received is faster than an access rate to the counter.

14. The apparatus of claim 11, wherein the processor is further configured to receive a third packet, determine a size of the third packet, and when the size of the third packet is greater than a predetermined threshold, update the counter with a value corresponding to the size of the third packet.

15. The apparatus of claim 14, wherein the predetermined threshold is set to a minimum packet size that yields a maximum counter access rate.

16. The apparatus of claim 11, wherein the processor is further configured to receive a third packet, determine a size of the third packet, and when the size of the third packet is less than a predetermined threshold, update the counter with a value corresponding to the predetermined threshold.

17. The apparatus of claim 11, wherein the value of the counter corresponds to a number of packets, and the processor is further configured to receive a third packet, determine a size of the third packet, and when the size of the third packet is greater than a predetermined threshold, update the counter with a value of one.

18. The apparatus of claim 11, wherein the value of the counter corresponds to a number of packets, and the processor is further configured to receive a third packet, determine a size of the third packet, and when the size of the third packet is less than a predetermined threshold, access a lookup table to obtain a value with which to update the counter.

19. A non-transitory computer readable storage media encoded with instructions that, when executed by a processor, cause the processor to:
receive, at a network device, a first packet followed by a second packet;
probabilistically select the second packet to update a value of a counter of the network device and probabilistically not select the first packet to update the value of the counter; and
update the value of the counter to account for both the first packet and the second packet,
wherein a probability to select the second packet to update the value of the counter is based on a size of the second packet.

20. The non-transitory computer readable storage media of claim 19, wherein a rate of receiving the first packet and the second packet is faster than an access rate to the counter.

* * * * *